(No Model.) 3 Sheets—Sheet 2.
W. S. REEDER.
BALING PRESS.
No. 437,242. Patented Sept. 30, 1890.
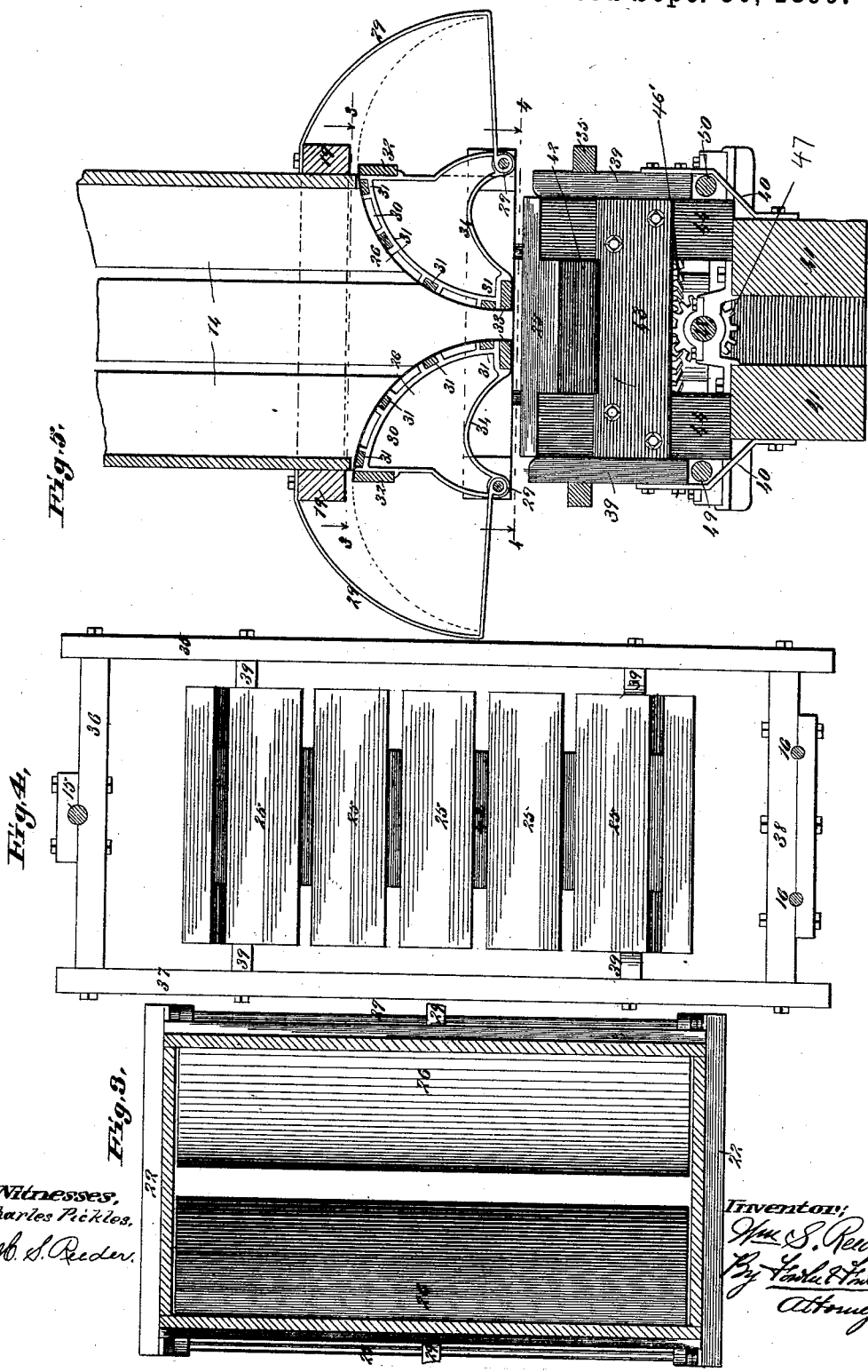
Witnesses,
Charles Pickles.
W. S. Reeder.
Inventor;
Wm. S. Reeder,
By Parke Finlay
Attorney.

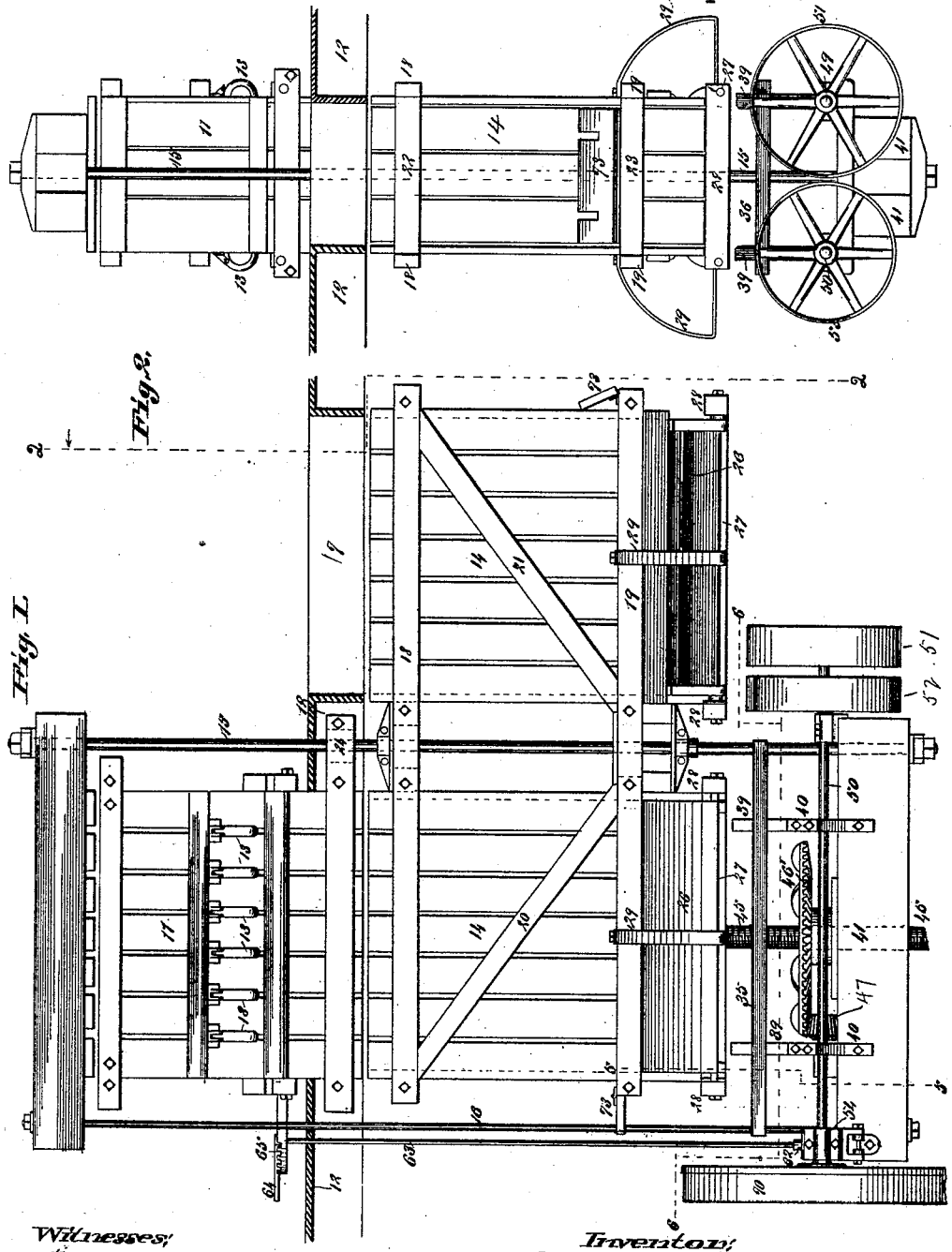

(No Model.) 3 Sheets—Sheet 3.
W. S. REEDER.
BALING PRESS.
No. 437,242. Patented Sept. 30, 1890.
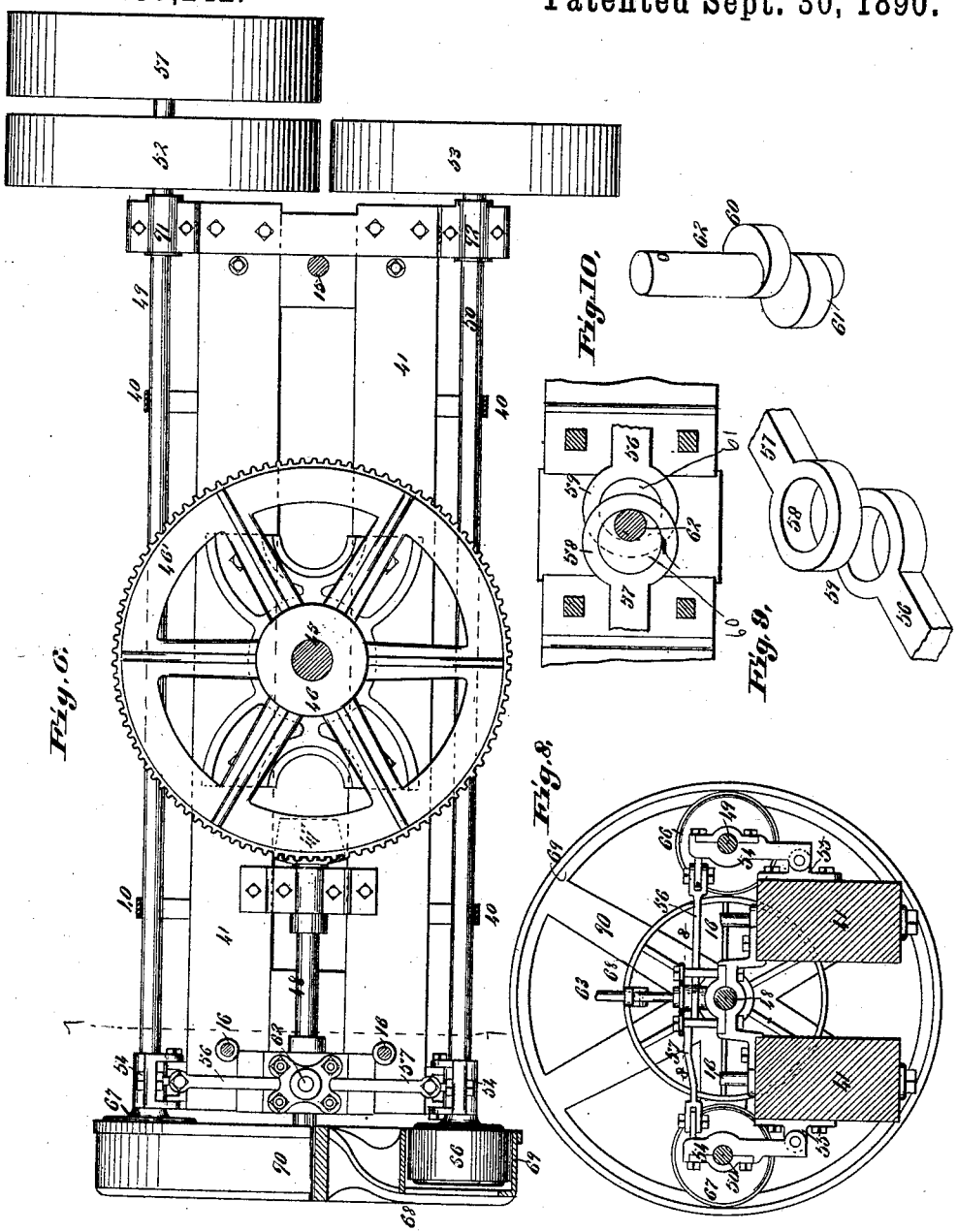

UNITED STATES PATENT OFFICE.

WILLIAM S. REEDER, OF ST. LOUIS, MISSOURI, ASSIGNOR TO THE KINGSLAND & DOUGLAS MANUFACTURING COMPANY, OF SAME PLACE.

BALING-PRESS.

SPECIFICATION forming part of Letters Patent No. 437,242, dated September 30, 1890.

Application filed September 13, 1889. Serial No. 323,870. (No model.)

*To all whom it may concern:*

Be it known that I, WILLIAM S. REEDER, a citizen of the United States, residing at St. Louis, in the State of Missouri, have invented certain new and useful Improvements in Baling-Presses, of which the following is such a full, clear, and exact description as will enable any one skilled in the art to which it appertains to make and use the same, reference being had to the accompanying drawings, forming part of this specification.

My invention relates more especially to presses for baling cotton, and more particularly to baling-presses wherein the bale is made up of several successive charges.

The novel features of the invention will be pointed out in the claims making a part hereof.

The present invention is an improvement upon a baling-press patented to me on the 13th day of March, 1888, No. 379,414.

In the accompanying drawings I have illustrated a baling-press made in accordance with my invention, the same being the best form of said invention so far devised by me.

Figure 1 of said drawings is a front elevation of my baling-press; Fig. 2, a side elevation seen from the line 2 2 of Fig. 1, looking in the direction of the arrows to said line; Fig. 3, a plan on the line 3 3 of Fig. 5; Fig. 4, a plan on the line 4 4 of Fig. 5; Fig. 5, an enlarged vertical section on the line 5 5 of Fig. 1; Fig. 6, an enlarged horizontal sectional view on the line 6 6 of Fig. 1; Fig. 7, a vertical sectional view seen from the line 7 7 of Fig. 6, looking in the direction of the arrows to said line; Figs. 8, 9, and 10, views of details on an enlarged scale, showing the eccentrics for shifting the driving mechanism, so as to actuate the press in one or the other direction.

The same figures of reference indicate the same parts throughout the several views.

11 is the upper box, in which the bale is compressed and finished, the same being arranged above a platform or floor 12 of the second story. This upper box is provided with automatic dogs 13, which retain the successive charges therein after the follower has receded. The construction and operation of this upper box and the dogs make no part of this invention, the same being covered by the Letters Patent heretofore alluded to.

14 14 are the revolving charging-boxes, which are swung about a stout iron rod 15, bolted to the base of the press and to the top of the upper box, that is stayed at the other side of the press to the base thereof by rods 16 16. These boxes are arranged below the floor 12, in which is cut an opening 17 at the side of the upper box for the cotton to be put in said boxes. These charging-boxes are made up of vertical slats, which are joined together at each side by timbers 18 19, between which are diagonal pieces 20 21. The timbers 18 19 at each side of the boxes are joined together by cross-timbers 22 23 at each end. The revolving boxes 14 14 are supported in position by bearings in cross-timbers secured to the timbers 18 18 and 19 19 midway between said cross-timbers. The rod 15 is stayed near its middle by a bearing 24, supported by part of the upper box 11. The boxes are so arranged that when one is directly beneath and in alignment with the upper box the other is in alignment with and directly beneath the opening 17. The charging-box, that is in position to have its charge compressed, is also in alignment with the follower 25, which passes through said charging-box in compressing the charge into the upper chamber and down through and below the former in reaching its lowest position, so that the box can be revolved out of line with the upper box and brought in position below the opening 17, as the charged box is positioned below the upper box and above the follower.

In order to retain the cotton in the charging-boxes when they are being filled and while rotated from position beneath the opening 17 to position above the follower, a movable bottom is provided for said boxes. It is preferably made up of two semicircular sections 26 26, which extend in the direction of the length of the boxes and are pivoted about rods 27 27, that are carried by end pieces 28, secured to the lower end of said boxes and below the same. From the timbers 19 at each side of the press, about midway of it and the charging-box, extend bent iron straps 29 29, the other end of which is attached to the rods 27.

These bent iron straps are made to retain the semicircular parts 26 26 when they are thrown outward by the upward movement of the follower. This movable bottom can be made in any other approved way so long as it will permit the follower to pass upward and hold the cotton in the charging-box before the movement of the follower commences. Considerable space may be left between the semicircular pieces, as the cotton will not fall through an opening except it be quite large. They may be constructed in any desired manner, but are here shown as composed of quadrant-shaped iron pieces 30, arranged at suitable distances apart and pivoted to the rods 27. Timbers 31 may be arranged across said iron pieces and a covering of sheet-iron or other material placed over the same. Said iron pieces are stayed together at each end of the arc or quadrant by timbers 32 33. The timbers 32 strike against the sides of the boxes 14 when the semicircular parts are pushed in, and thus serve to limit the inward play of the same. The iron pieces 30 should preferably be curved at 34, as shown, in order that they may be lifted at their outer ends by the follower and thus raised gradually and easily. So far as I am aware I am the first to construct a charging-box with a bottom that is moved out of the way by the rise of the follower.

The construction of the follower itself is no part of this invention, the said follower being of the customary kind. In order to guide the follower and keep it in alignment with the box containing the charge to be compressed, I provide a frame 35, 36, 37, and 38, which surrounds guide-pieces 39, vertically arranged, that are fastened to said frame. The lower ends of the four guide-pieces 39 are secured by brackets 40 to the base-frame 41 of the press. The upper edges of said guide-pieces 39 are beveled, so that the follower may readily pass down between the guides in resuming its normal position. The follower is made up of a series of cross-pieces 25, Fig. 4, arranged upon a timber 42, Fig. 5, which is carried at each end by two cross-timbers 43, each of which cross-timbers 43 is bolted to upright timbers 44 at the ends. The upright timbers 44, when the follower is down, rest against the base-frame 41 of the press. When the follower moves up, the timbers 42, the cross-timbers 43, and the uprights 44 rise with it and are guided by the guides 39 into the box containing the charge to be compressed. Fig. 5 shows the normal position of the follower and the semicircular parts 26 of the movable bottom. In Fig. 1 the semicircular parts 26 of the right-hand box are in their normal position, closing the bottom of the charging-box, and the semicircular parts 26 of the left-hand box are shown thrown outward by the follower, which is up in the charging-box.

45 is the screw that raises the follower. This screw is rigidly connected to the follower and passes through a nut 46, journaled in the base-frame 41, which is generally known as the "nut-frame." This nut has a bevel-wheel 46' secured to it, the same as in my patent referred to above, and is actuated by a bevel gear-wheel 47, arranged upon a shaft 48, which is supported by bearings carried by the base-frame 41. The shaft 48 may be rotated in one or the other direction by mechanism hereinafter to be described, and thus rotates the bevel-wheel and nut 46 in one or the other direction.

It will be understood of course that the nut 46, to which the bevel-wheel is attached, is provided at the center with a screw-thread which meshes with the screw-threads of the screw 45.

It will be seen from the foregoing that the nut and bevel-wheel 46' revolve, but that the screw does not rotate. When the bevel-wheel is rotated in one direction the screw is driven upward, and when rotated in the other direction the screw and follower are lowered.

Supported by bearings at each end of the base-frame 41 are two shafts 49 and 50, the former of which is driven by a pulley 51, which is rotated by a belt connected with any suitable prime motor. The shaft 49 also carries a pulley 52, which drives, by means of a belt, (not shown in the drawings,) a pulley 53 upon the shaft 50. The shafts 49 and 50 are thus rotated in one and the same direction. The bearings 54 54, in which the other ends of the shafts 49 and 50 are journaled, are pivoted by brackets 55 55 to the base-frame 41, and to them are pivoted bars 56 and 57, which terminate in rings 58 59, that encircle eccentrics 60 61 upon a short shaft 62, that is coupled to a rod 63, which passes upward through the floor 12 and terminates in a handle 64, which can be made to engage the teeth of a curved bar 65. The rod, handle, and curved bar are all described in my patent referred to above. The shafts 49 and 50 carry friction-wheels 66 and 67, which are placed between an inner rim 68 and an outer rim 69 of a large friction-wheel 70, that is rigidly mounted upon the shaft 48, heretofore described. By manipulating the handle 64 the eccentrics can be so operated as to throw the friction-wheels 66 and 67 both into engagement with the outer rim 69 of the wheel 70 or both in contact with the inner rim 68 of said wheel. When the friction-wheels are against the outer rim 69, the bevel-wheel and nut 46 are driven so as to raise the follower and screw at a slow rate of speed, but with an increase of power due to the increase of leverage, and when the friction-wheels 66 and 67 are against the inner rim 68 the follower is lowered at a rapid rate of speed to gain time.

In my patent referred to above a mechanism like the foregoing is used to actuate the follower; but in said previous patent the boxes that journal the power-shafts on the base-frame slide instead of being pivoted, as in the present case. The base-frame and the arrangement of parts thereon in the present invention are also more compact and convenient than that shown in said patent.

The boxes 71 and 72, which journal the shafts 49 and 50, respectively, near the drive-pulleys, should be constructed to allow a slight play of said shafts, in order to permit them to be readily shifted at the other end by the eccentrics heretofore described.

The revolving boxes 14 at their outer ends are furnished with hinged boards 73, which are provided with notches that engage the two rods 16 16 and lock the boxes in position during charging and pressing.

The operation of my apparatus is as follows: Cotton is thrown in the box 14, which is beneath the opening 17, until said box is full. The hinged board 73, which engages the rods 16, is now folded back, so as to leave said boxes free to revolve, and the box which is filled is brought above the follower and beneath the upper box. The hinge-board 73, carried by the charged box, which is in position to have its charge compressed, is folded down so as to engage the rods 16 and hold the boxes immovable. The friction-pulleys 66 and 67 are now shifted from their normal position of rest between the two rings 68 and 69 against the outer rim 69 by the manipulation of the handle 64, which actuates the eccentrics and pivoted boxes, as before described. The friction-wheel 70 and the shaft 48 begin to rotate, and the wheel 47 and bevel-wheel 46' to drive the screw 45, carrying the follower upward until the charge is compressed, when the handle 64 is manipulated so as to move the friction-wheels 66 and 67 into contact with the rim 68. The follower now begins to rapidly descend. During the first part of the rise of the follower the movable semicircular bottoms 26 are forced outward automatically by the follower. During the time the charge is being compressed and the follower is returning to its normal position the other box, which is beneath the opening 17, is being filled. Previous to the filling of said latter box the movable bottoms 26 are pushed inward by hand, so as to close the lower end of said box. After the said box is filled the same operation as before is gone through with. When the follower has reached its normal position, the handle 64 is brought to its middle position, so as to throw the friction-wheels 66 and 67 midway between the two rims of the friction-wheel 70. Thus the rotation of the bevel-wheel and nut 46 ceases, while that of the shafts 49 and 50 may continue.

Instead of having two revolving boxes I may use three or more.

It is within the spirit of my invention to operate the automatic bottom by other means than the follower and also to make said bottom close automatically after the follower has receded therefrom.

I am aware that presses have been constructed heretofore with a plurality of charging-boxes, each of which may be brought in position to compress the charge therein; but the use of revolving boxes for this purpose is made more practical by the movable automatic bottom devised by me.

What I desire to claim, and secure by Letters Patent of the United States, as my invention, is—

1. A baling-press having a charging-box provided with a movable bottom operated by the follower, which bottom is made up of semicircular parts 26, pivoted to said charging-box, and having straps 29, for limiting the outward play of said semicircular parts, substantially as described.

2. The combination, in a baling-press, of the base-frame 41, the shafts 49 and 50, journaled in bearings supported thereby, the drive-pulley 51, carried by one of said shafts, pulleys 52 and 53, carried by the said respective shafts, brackets 55, for pivoting the bearings of the ends of said shafts remote from said pulleys to said base-frame, friction-wheels carried by said other end of the shafts, a wheel 70, having inner and outer rims, between which said friction-wheels are located, a shaft driven by said wheel 70 for actuating the pressing mechanism, and connecting-rods and eccentrics for shifting the pivoted bearings to bring the friction-wheels in contact with the outer or inner rims of said wheel 70 in order to propel the pressing mechanism in one or the other direction.

In testimony whereof I have hereunto set my hand and affixed my seal this 12th day of August, 1889, in the presence of the two subscribing witnesses.

WILLIAM S. REEDER. [L. S.]

Witnesses:
A. GIESEN,
J. A. BACHMAN.